United States Patent
Han et al.

(10) Patent No.: US 6,707,216 B2
(45) Date of Patent: Mar. 16, 2004

(54) SINGLE PHASE LINE START PERMANENT MAGNET SYNCHRONOUS MOTOR

(75) Inventors: Seung Do Han, Incheon (KR); Hyoun Jeong Shin, Incheon (KR); Kwan Yeul Cho, Seoul (KR); Yoon Hyeo Kim, Yongin (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/041,499

(22) Filed: Jan. 10, 2002

(65) Prior Publication Data

US 2002/0190595 A1 Dec. 19, 2002

(30) Foreign Application Priority Data

Jun. 14, 2001 (KR) ............................................ 2001/33539

(51) Int. Cl.[7] ........................ H02K 17/16; H02K 21/12
(52) U.S. Cl. .............. 310/211; 310/156.78; 310/156.82
(58) Field of Search ..................... 310/156.38–156.46, 310/156.78–156.84, 156.77, 211

(56) References Cited

U.S. PATENT DOCUMENTS

| | | | | |
|---|---|---|---|---|
| 4,506,181 A | * | 3/1985 | Jones et al. | 310/156.78 |
| 4,924,130 A | * | 5/1990 | Fratta | 310/261 |
| 5,067,166 A | * | 11/1991 | Ito | 382/215 |
| 5,510,662 A | * | 4/1996 | Tanimoto et al. | 310/156.53 |

* cited by examiner

Primary Examiner—Tran Nguyen
(74) Attorney, Agent, or Firm—Birch, Stewart, Kolasch & Birch, LLP

(57) ABSTRACT

A single phase line start permanent magnet synchronous motor is started by an interaction between magnetic fields of the coil and of the secondary conductor, and an normal operation can be performed using only the permanent magnet and the operating condenser of small capacity, only the main coil, or only the operating condenser when the synchronous rotating speed is reached and the rotation is started, and therefore an additional direct current supplying device for supplying the direct current and the position sensor for sensing the rotational position of the rotor can be excluded, the structure can be made compactly by constructing the driving circuit simply, and manufacturing cost can be reduced.

18 Claims, 10 Drawing Sheets

SINGLE PHASE LINE START PERMANENT MAGNET SYNCHRONOUS MOTOR

BACKGROUND OF THE INVENTION

1. Field of the Invention

The present invention relates to a single phase line start permanent magnet synchronous motor, and particularly, to a single phase line start permanent magnet synchronous motor by which a driving efficiency can be improved, a structure can be compact, and a manufacturing cost can be reduced.

2. Description of the Background Art

Generally, a brushless direct current motor is used as a fan motor for a refrigerator, a microwave oven, a humidifier, and a small electric fan because the brushless direct current motor has a simple structure and costs a little.

The brushless direct current motor has relatively higher efficiency than that of an alternating current motor, a speed of the motor can be changed by controlling an applied electric power, and has high reliability and long life span.

Figure 1:
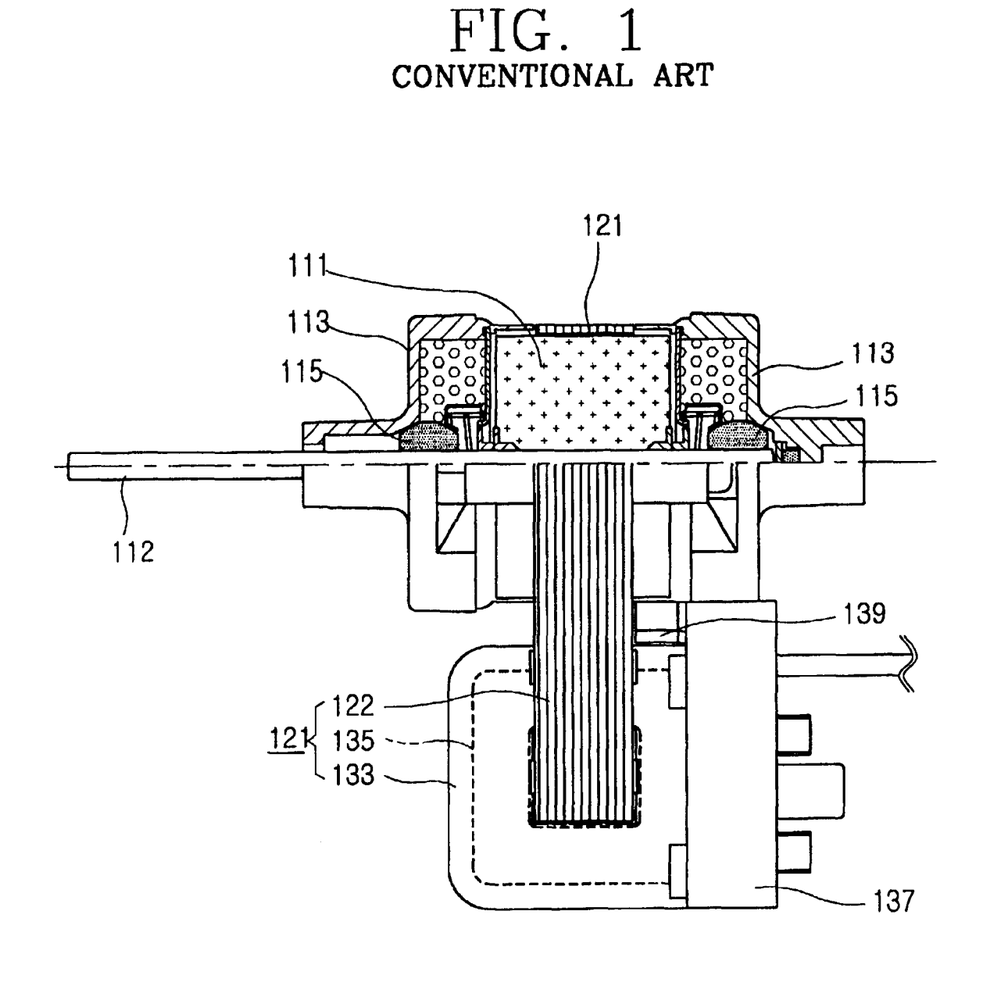
FIG. 1 is a partially cross-sectional view showing a conventional brushless direct current motor in a shaft direction.
Figure 2:
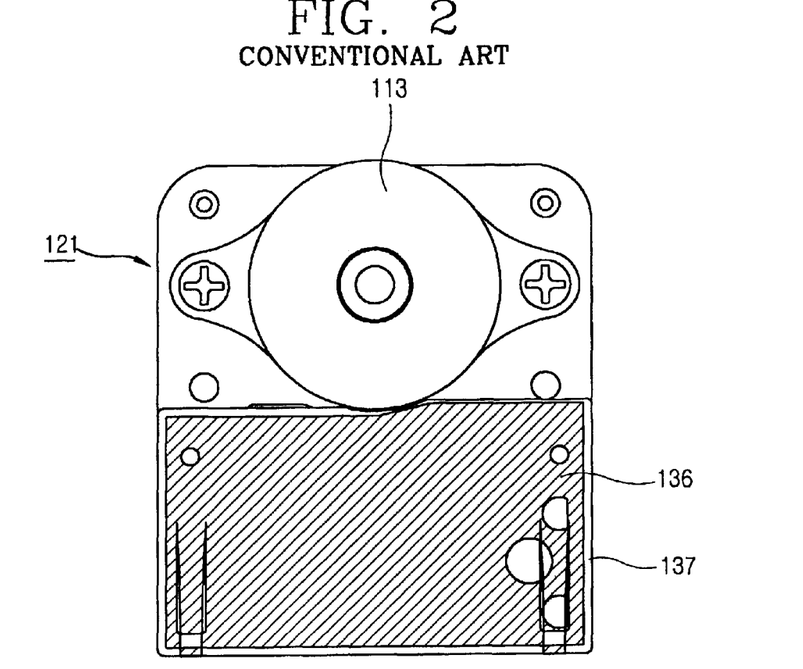
FIG. 2 is a rear elevation view showing the conventional brushless direct current motor.
Figure 3:
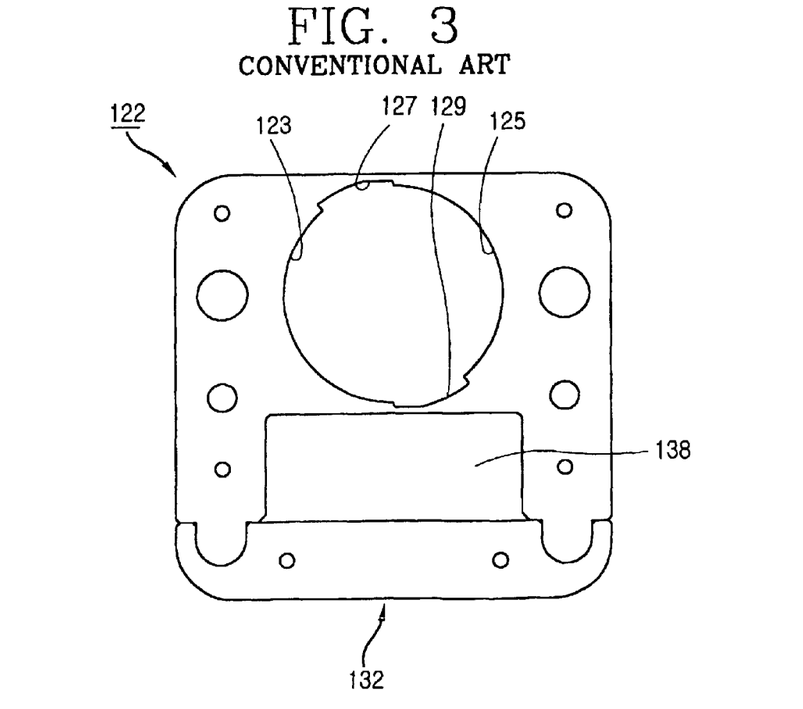
FIG. 3 is a front view showing a stator core in the brushless direct current motor shown in FIG. 1.

FIG. 1 is a partially cross-sectional view showing a conventional brushless direct current motor in longitudinal direction, FIG. 2 is a rear elevation view showing the conventional brushless direct current motor, and FIG. 3 is a front view showing a stator core of the conventional brushless direct current motor.

As shown therein, the brushless direct current motor comprises: a rotor 111; a stator 121 for receiving the rotor 111 with a certain air gap therebetween; a PCB (Printed Circuit Board) 136 for forming a drive circuit; and a PCB cover 137 coupled to one side of the stator 121 for receiving the PCB 136.

The rotor 111 is formed to have circular cross section using a permanent magnet, and a rotary shaft 112 is coupled to the shaft of the rotor 111 as a single body.

In addition, a pair of bearing housings 113 including bearings 115 for supporting the rotary shaft 112 are coupled to both sides of the rotor 111 along with a direction of shaft line of the rotary shaft 112.

Also, as shown in FIGS. 1 and 3, the stator 121 comprises: a first stator core 122 including a first pole-shoe 123 and a second pole-shoe 125, which are facing each other with a predetermined air gap, formed as a single body; a second stator core 132 coupled to one side of the first stator core 122 as a single body; and a bobbin 133, on which a coil 135 is wound a plurality of times, coupled in an inner space 138 formed by coupling the first stator core 122 and the second stator core 132 as penetrating the inner space 138.

In addition, the first stator core 122 and the second stator core 132 are fixed and coupled as a single body with each other by insulatingly stacking a plurality of steel sheets. And a first detent groove 127 and a second detent groove 129, which are apart from an outer diameter surface in a radial direction, and extended as a predetermined width via a circumferential direction for starting the rotor 111, are formed on the first stator core 122 respectively.

On the other hand, a PCB cover 137 for receiving the PCB 136 is disposed on one side of the bobbin 133 via the rotary shaft line direction of the rotor 111, and a sensor receiving part 139 is formed on the PCB cover 137 so as to receive and support a position sensor (not shown) which is disposed between the bobbin 133 and the rotor 111 for sensing a rotary position of the rotor 111 (see FIG. 1).

In the above brushless direct current motor, the first detent groove 127 and the second detent groove 129 are formed on the first pole-shoe 123 and on the second pole-shoe 125 so that the rotor 111 is not disposed on a position where an electric torque is zero for starting the rotor 111. However, the air gap is enlarged by forming the detent grooves, and then an effective magnetic flux is reduced and an efficiency of the motor is lowered.

Also, an additional direct current supplying device (not shown) which has a large volume and costs high should be disposed in order to drive the motor making the utility alternating current as an input power, and a drive circuit for driving the rotor 111 and the position sensor (not shown) for sensing the position of the rotor 111 are should be included, a volume and price of the motor are increased.

SUMMARY OF THE INVENTION

Therefore, an object of the present invention is to provide a single phase line start permanent magnet synchronous motor by which a driving efficiency of the motor can be improved, a structure of the motor is compact, and a manufacturing expense can be reduced.

To achieve the object of the present invention, as embodied and broadly described herein, there is provided a single phase line start permanent magnet synchronous motor comprising: a rotary shaft; a rotor core coupled on outer circumferential surface of the rotary core so as to be rotatable; a plurality of permanent magnets fixedly inserted into the rotor core in rotary shaft direction and disposed so as to be apart from each other in circumferential direction; a rotor including a secondary conductor fixedly inserted between protruded parts of the rotor core in rotating shaft line direction; a stator located on an outer circumferential surface of the rotor with a predetermined air gap therebetween; bearings for supporting both end parts of the rotary shaft in shaft line direction of the rotary shaft so as to support the rotary shaft; a first housing, through which the rotary shaft is penetrated, coupled to the outer circumferential surface of the stator for receiving bearing on one side among those bearings; and a second housing, through which the rotary shaft penetrates, coupled on one side of the first housing for receiving the bearing on the other side among the bearings.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 4:
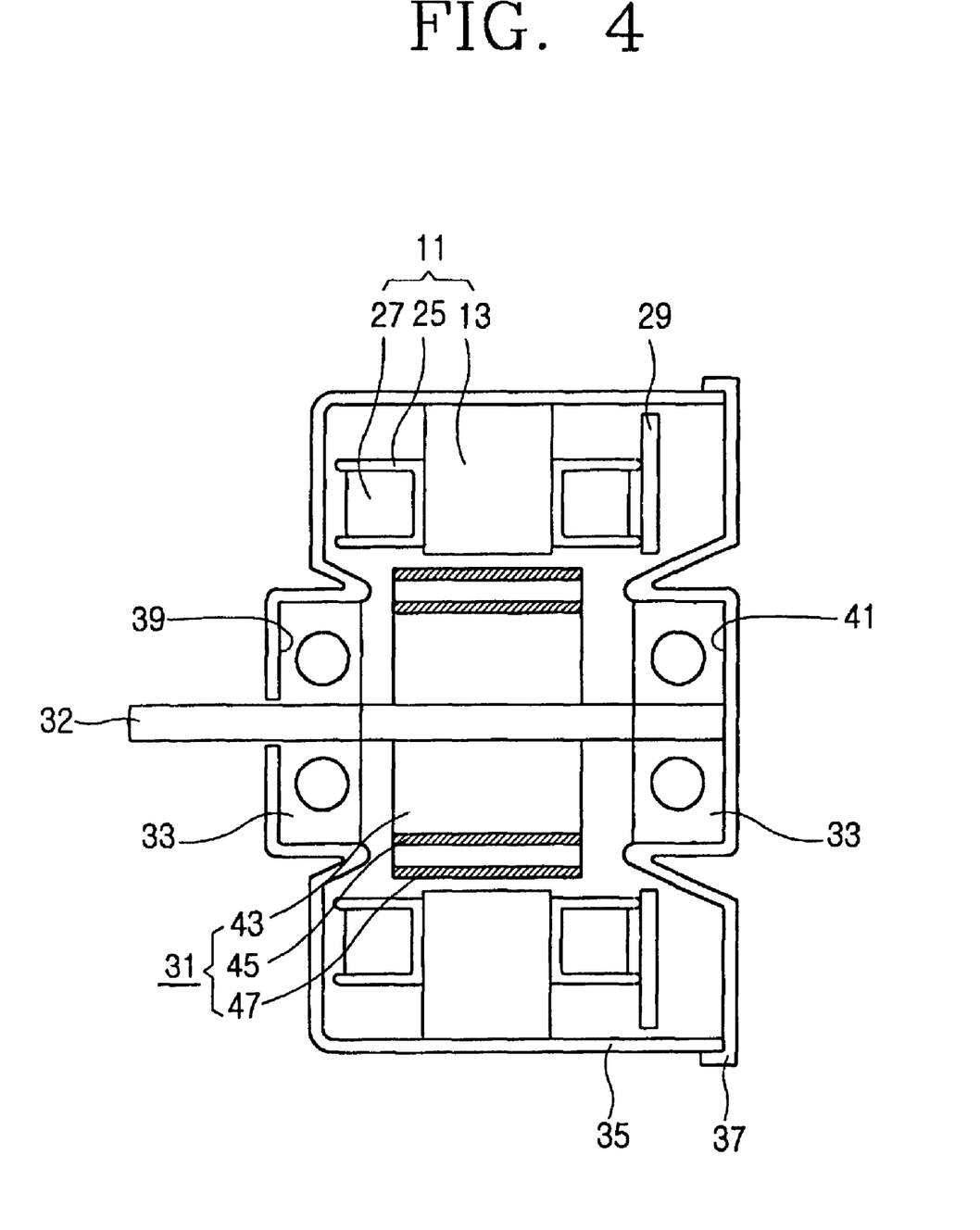
FIG. 4 is a cross-sectional view showing a single phase line start permanent magnet synchronous motor according to an embodiment of the present invention.
Figure 5:
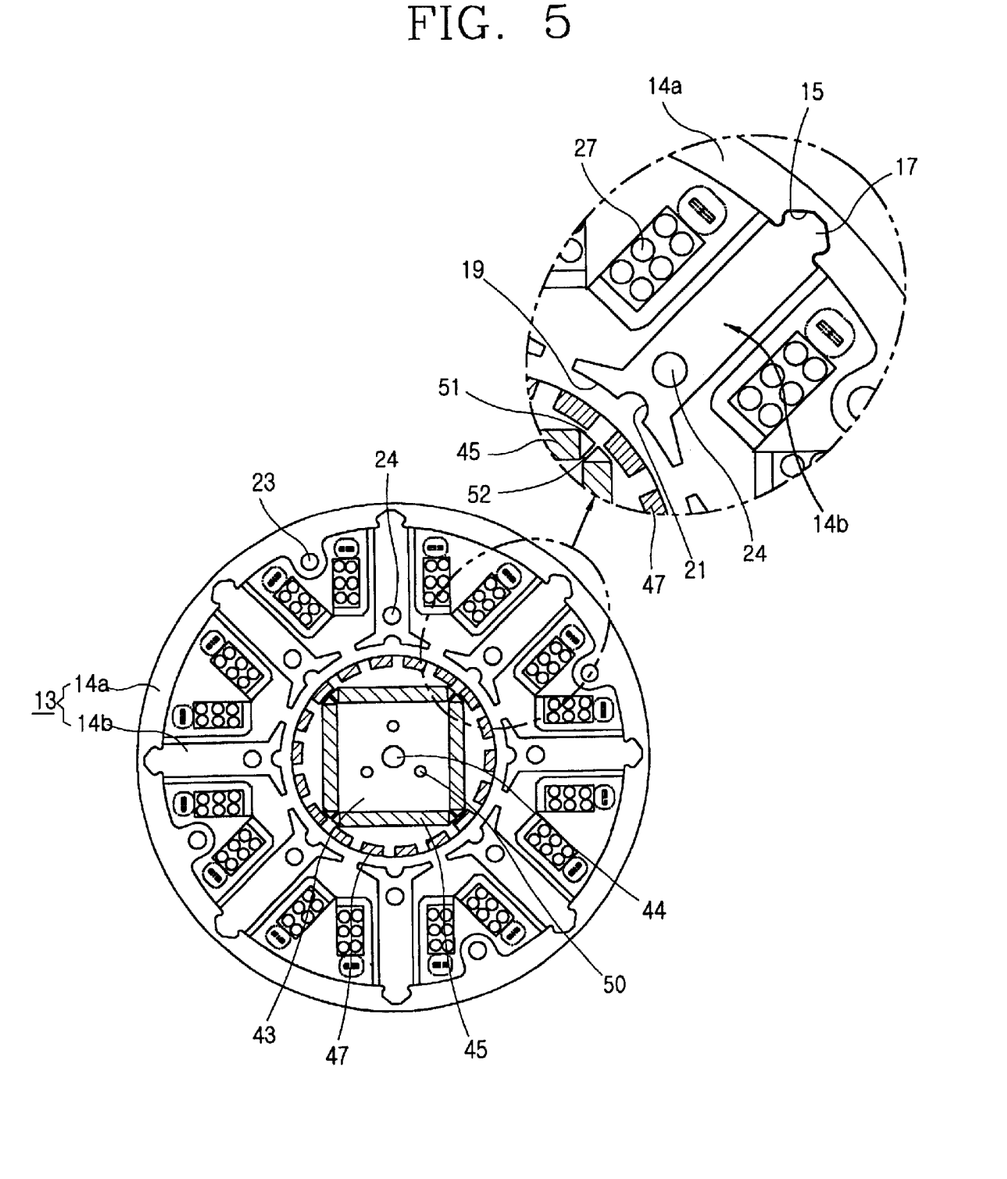
FIG. 5 is a plan view showing a stator and a rotor shown in FIG. 4.
Figure 6:
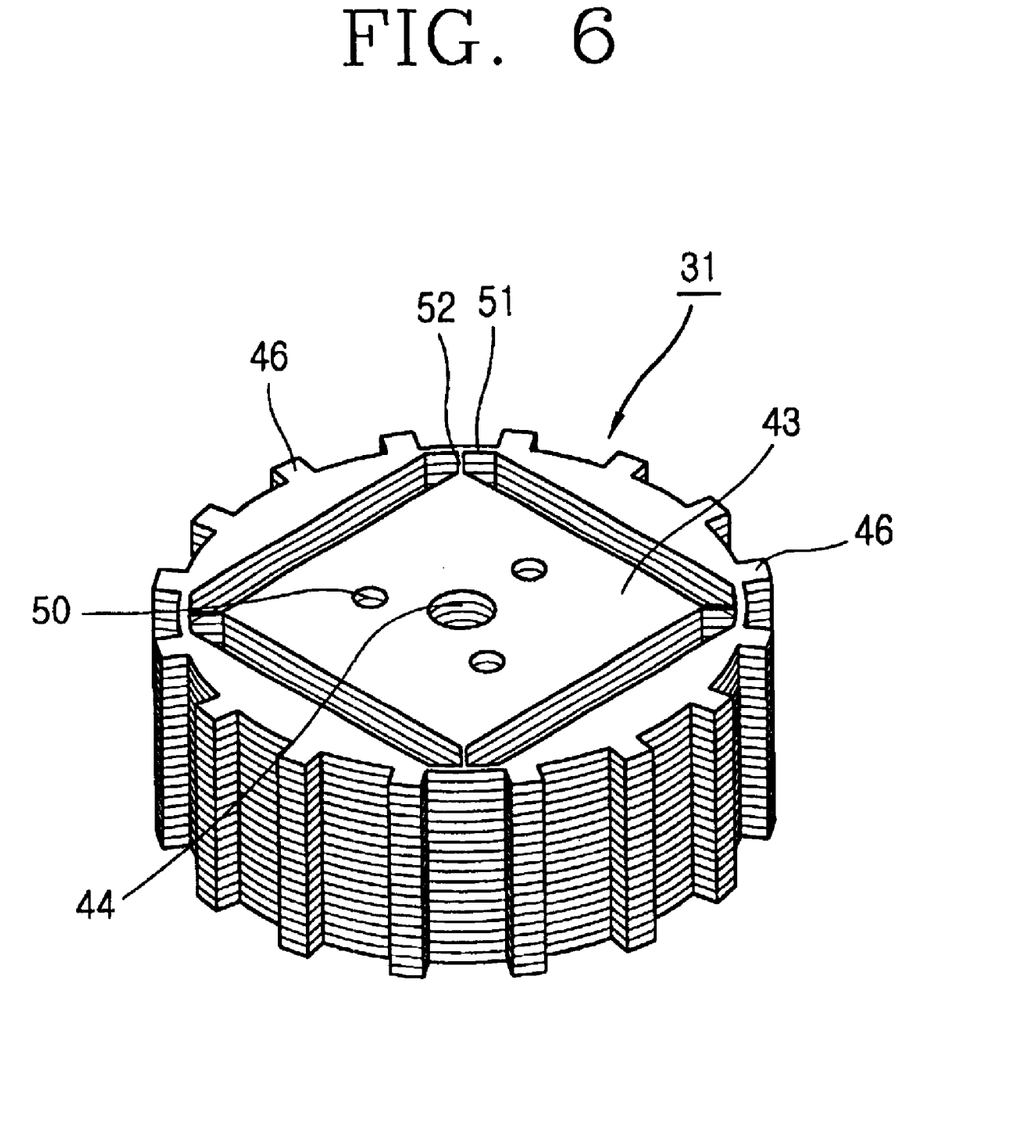
FIG. 6 is a perspective view showing the rotor shown in FIG. 5.
Figure 7:
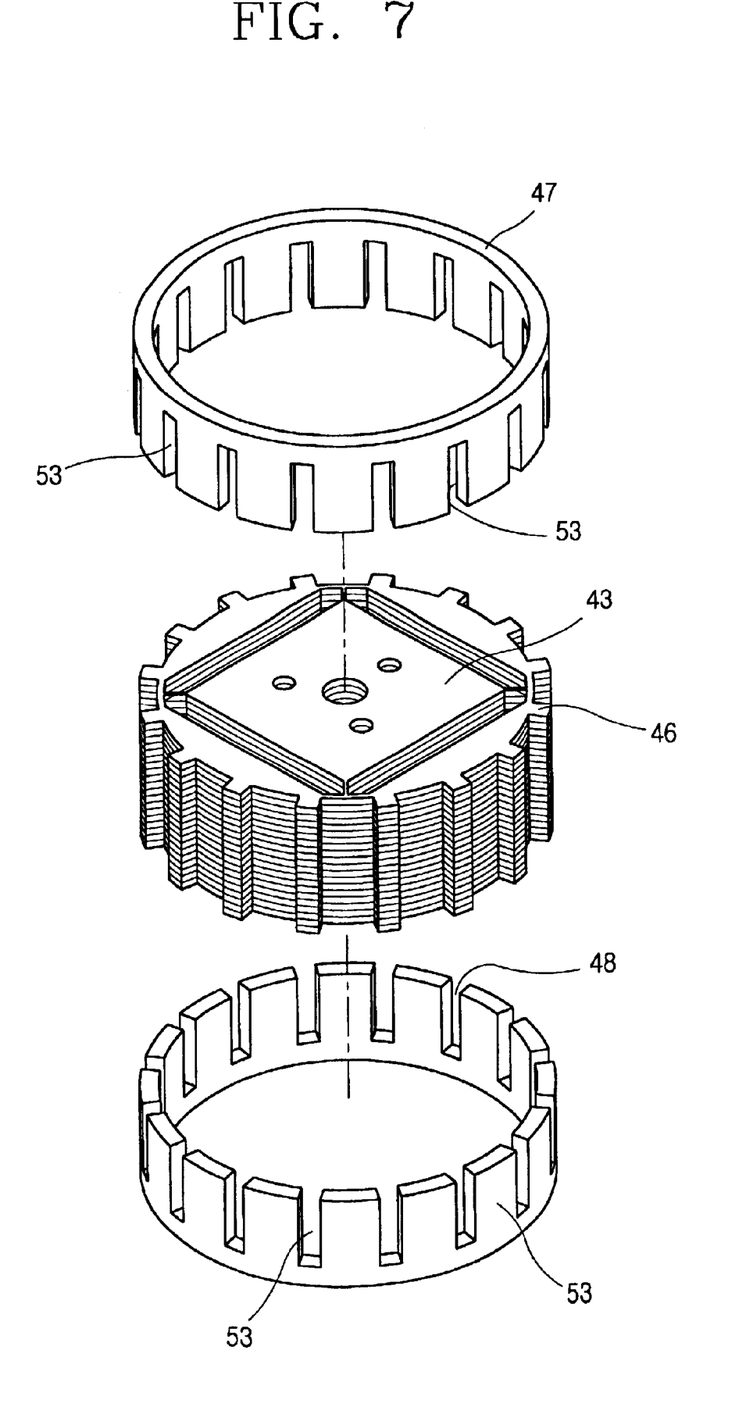
FIG. 7 is a perspective view showing an example of coupling a secondary conductor to the rotor shown in FIG. 6.

FIG. 4 is a cross-sectional view showing a single phase line start permanent magnet synchronous motor according to an embodiment of the present invention, FIG. 5 is a plan view showing a stator and a rotor shown in FIG. 4, FIG. 6 is a perspective view showing the rotor shown in FIG. 5, and FIG. 7 is a perspective view showing an example that a secondary conductor shown in FIG. 5 is coupled to the rotor.

According to an embodiment of the present invention, the single phase line start permanent magnet synchronous motor comprises: a rotary shaft 32; a rotor 31 coupled to an outer circumferential surface of the rotary shaft 32 so as to be rotatable; a stator 11 located on an outer circumferential surface of the rotor 31 with a predetermined air gap therebetween; bearings 33 supporting both end parts of the rotary shaft 32 via a shaft line direction of the rotary shaft 32 so as to support the rotary shaft 32; a first housing 35, through which the rotary shaft 32 penetrates, coupled on an outer circumferential surface of the stator 11 for receiving a bearing on one side between the bearings 33; a second housing 37, through which the rotary shaft 32 penetrates, coupled on one side of the first housing 35 for receiving another bearing on the other side between the bearings 33.

As shown in FIGS. 4, 5, 6, and 7, the rotor 31 comprises: a rotor core 43 having a plurality of protruded parts 46 on outer circumferential surface; a plurality of permanent magnets 45 having square cross-sections inserted and coupled to the rotor core 43 along with rotary shaft line direction and apart from each other in circumferential direction; and a plurality of secondary conductors 47 coupled between the protruded parts 46 of the rotor core 43 as a single body.

A shaft hole 44 is formed at a center part of the rotor core 43 so as to receive the rotary shaft 32, and a plurality of permanent magnet receiving parts 48 having square cross sections are formed near an inner side of the outer circumferential surface in radial direction from the shaft hole 44 so as to receive the permanent magnets 45.

In addition, the rotor core 43 is formed by stacking a plurality of steel sheets having shaft hole 44 at center parts so as to receive the rotary shaft 32 and coupling the sheets using a rivet 50.

In addition, as shown in FIG. 5, the permanent magnet receiving part 48 is formed to be corresponded to the cross section shape of the permanent magnet 45, that is, square cross section, and disposed near the outer circumferential surface of the rotor core 43 as 90° phase so as to make a square structure in Figure.

In addition, the respective permanent magnet receiving part 48 includes an empty space of triangular or square shape for preventing magnetic flux from leaking formed on an intersection. A link 51 and a web 52 are formed between the respective triangular or square spaces, and these are formed as a single body with the rotor core 43.

As shown in FIG. 7, the secondary conductor 47 which is made using a material having higher conductivity formed as a cylinder having a plurality of slots 53 on an outer circumferential surface in a radial direction, and one sides of the slots 53 are connected and the other sides are opened so as to receive the respective protruded parts 46 of the rotor core 43 inside the respective slots 53.

In addition, two secondary conductors 47 are disposed in order to coupled to the rotor core 43 along with the rotary shaft direction from upward and from downward, and these are formed as a single body with each other using a method such as welding after coupling.

Figure 8:
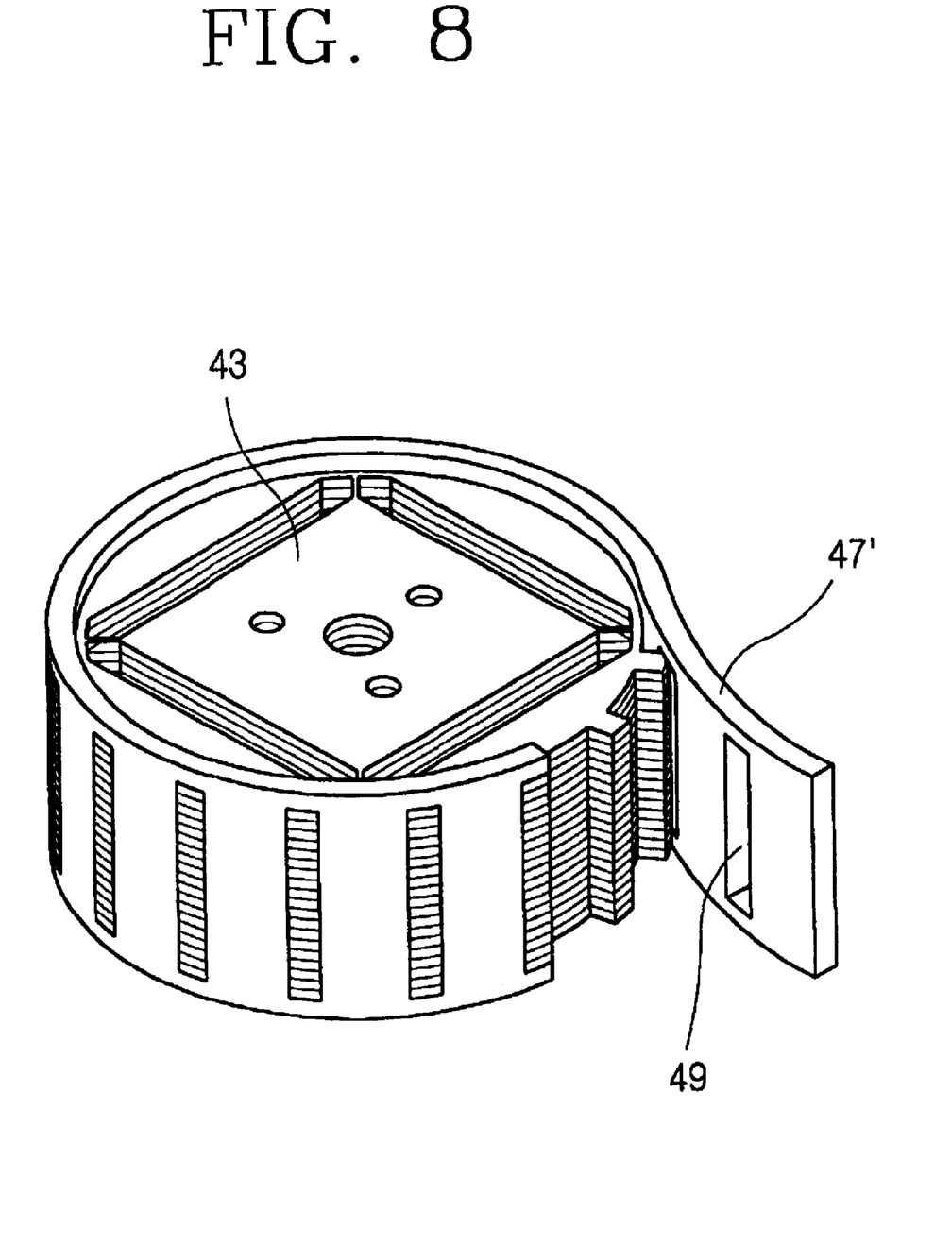
FIG. 8 is a perspective view showing an example of that a secondary conductor is coupled to a rotor according to another embodiment of the present invention.

Also, as shown in FIG. 8, the secondary conductor 47 may be formed as a plane surface on which slits 49 having sides connected to each other and inner sides in which the protruded parts of the rotor core 43 can be inserted by a press processing are formed. This another example of the secondary conductor 47' is rolled along with the outer circumferential surface of the rotor core 43 and coupled to the rotor core 43. In addition, it is desirable that the secondary conductor 47 and 47' is made using one of aluminum or brass.

On the other hand, as shown in FIGS. 4 and 5, the stator 11 comprises: a stator core 13 of circular ring shape having a larger outer diameter than the inner diameter of the first housing 35 so as to be coupled inside the first housing by a method such as pressing; a plurality of bobbins 25 coupled to outer side of the stator core 13; and a coil 27 wound a plurality of times on outer side of the bobbin 25.

In addition, the stator core 13 includes a yoke part 14a formed by insulatingly stacking steel sheets of circular reel shape and fixedly coupling the sheets using a rivet 23; and a plurality of teeth parts 14b formed by insulatingly stacking steel sheets of predetermined shape and coupled as a single body by a rivet 24, and protruded to central direction in a radial direction in the yoke part 14a and apart from each other in a circumferential direction.

Also, a plurality of projection receiving parts 15 are formed on inner circumferential surface of the yoke part 14a as depressed in a radial direction, and projection parts 17 formed on the teeth part 14b are coupled to the projection receiving parts 15 by a method such as press fitting.

In addition, pole parts 19 having a predetermined degree of curvature so as to be located with a predetermined air gap with the outer circumferential surface of the rotor and extended to the width direction along with the outer circumferential surface of the rotor 31 are formed on opposite both sides of the projection part 17 on the teeth part 14b, and a notch part 21, which is depressed outwardly in a radial direction of the rotor 31 and extended via the rotary shaft line direction of the rotary shaft 32 during stacking the steel sheets, is formed at center part of the respective pole part 19.

In addition, the plurality of bobbins 25 corresponding to the plurality of teeth parts 14b are coupled to outer side of the respective teeth parts 14b, and coils 27 are wound a plurality of time on outer circumferential surfaces of the bobbins 25. In addition, respective wound coils 27 are electrically connected to a circuit substrate 29 for wiring which is coupled to one side of the stator 11 via the rotary shaft line direction of the rotor 31, respectively.

In addition, the first housing 35 of cylindrical shape with one end opened comprises: a bearing receiving part 39 at center part on which a stepped part (not defined by a reference numeral) is formed so as to receiving the bearing 33; and a through hole (not defined by a reference numeral) for passing through the rotary shaft 32.

In addition, the second housing 37 is formed to have a cap shape so as to cover the opened part of the first housing 35, and a bearing receiving part 41 on which a stepped part (not defined by a reference numeral) is formed so as to receive the bearing 33 is disposed at center part of the second housing 37.

Hereinafter, another embodiment for the single phase line start permanent magnet synchronous motor according to the present invention will be described as follows.

Figure 9:
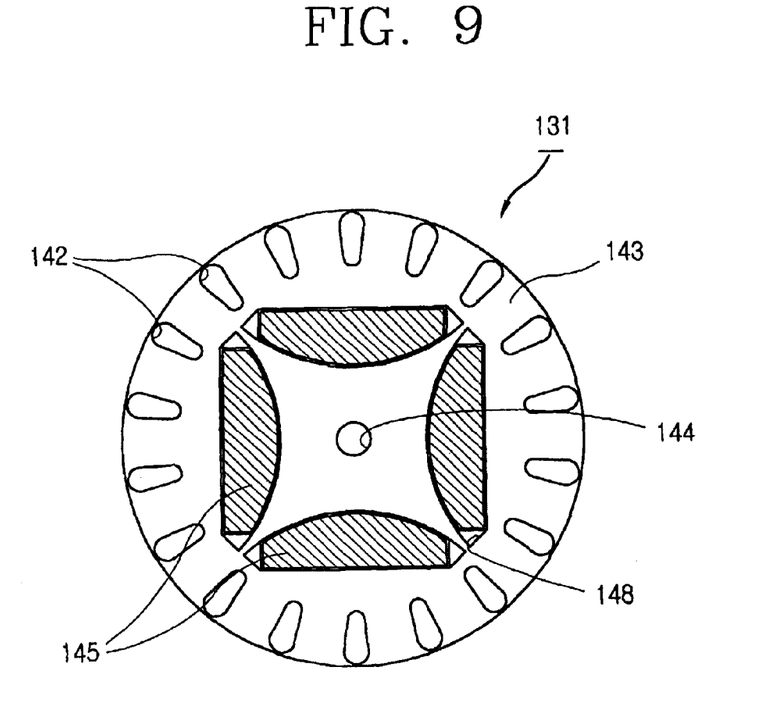
FIG. 9 is a plan view showing an another embodiment for the rotor in the single phase line start permanent magnet synchronous motor according to the present invention.

As shown in FIG. 9, according to another embodiment of the present invention, a rotor comprises: a squirrel type secondary conductor receiving part 142 penetrating in rotary shaft line direction so as to receive a secondary conductor (not shown) of squirrel type cross section, and disposed to be apart from each other in circumferential direction; a permanent magnet receiving part 148 formed on inner side of the squirrel type conductor receiving part 142 so as to receive a permanent magnet 145; a rotor core 143 having a shaft hole 144 formed at center part so as to receive the rotary shaft 32; a secondary conductor (not shown) having squirrel type cross section formed on the squirrel type conductor receiving part 142 so as to be inserted in a rotary shaft line direction; and a convex type permanent magnet 145 having roughly square cross section and one side of arc shape toward an inner side of the rotor core 143.

The rotor core 143 is formed by stacking a plurality of steel sheets having that shape of the rotor core 143 and fixedly coupling the sheets, and the permanent magnet receiving part 148 is formed so that a circumferential part on arc shape of the permanent magnet faces the rotary shaft 32.

Figure 10:
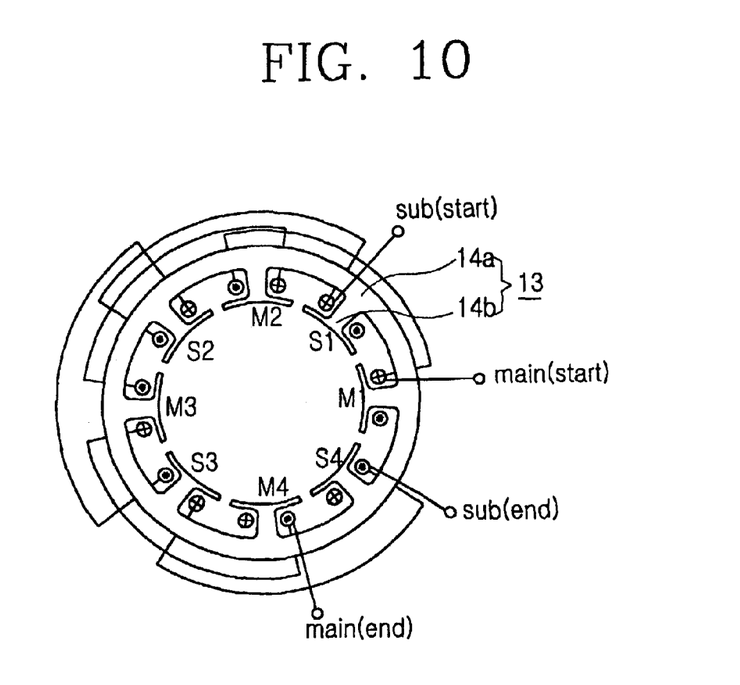
FIG. 10 is a schematic view showing a coil wound state in the single phase line start permanent magnet synchronous motor according to the present invention.
Figure 11:
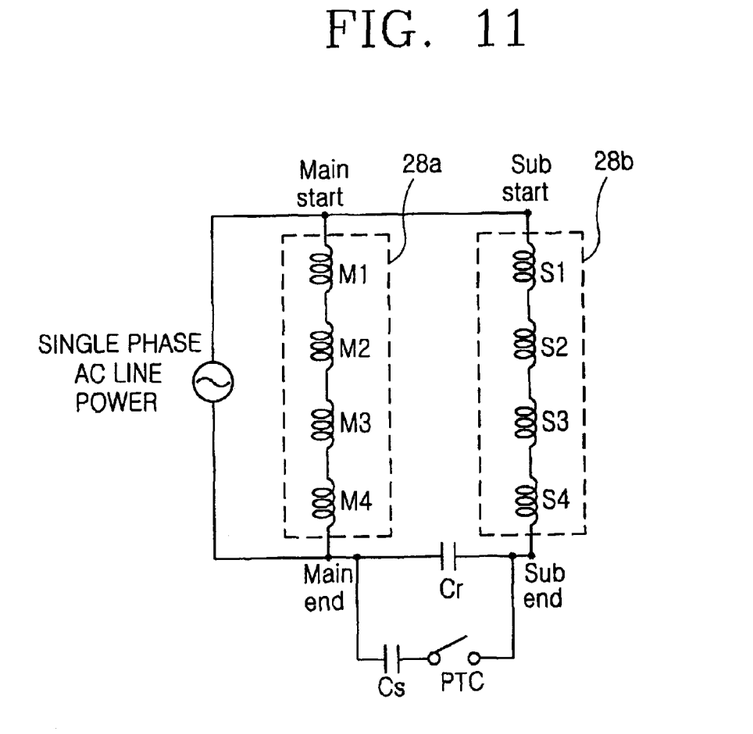
FIG. 11 is a schematic view showing a wiring state of a coil in the motor according to the present invention.

On the other hand, FIG. 10 is a schematic view showing a wiring state of the coil in the single phase line start permanent magnet synchronous motor according to the present invention, and FIG. 11 is a schematic view showing an example of winding state in the motor according to the present invention.

As shown therein, the coil 27 of the stator 11 includes a main coil 28a and a sub coil 28b having a plurality of coil parts M1~M4, and S1~S4 which are wound on the respective teeth parts 14b and connected to the electric source parallelly with each other.

The respective coil parts M1~M4, and S1~S4 of the main coil 28a and the sub coil 28b are formed as so called "concentrated winding", that is, the coil is concentratively wound on the outer circumferential surface of the bobbin 25 coupled to the respective teeth parts 14b, and these are formed to have 90° electrical phase difference with each other.

In addition, an operating condenser Cr is series connected to an end of the main coil 28a and an end of the sub coil 28b, and a starting condenser Cs and a PTC (Positive Temperature Coefficient) thermistor are connected between the end part of the main coil 28a and the operating condenser Cr so as to be series connected with each other. And the other end of the PTC thermistor is connected between the operating condenser Cr and the sub coil 28b.

On the other hand, the PTC thermistor is disposed as a switch for cutting the electric source of the starting condenser Cs in Figures, however, a centrifugal switch, which can cut the electric power of the starting condenser Cs when the rotor 31 reaches to a predetermined speed, may be used.

Hereinafter, constructing for the single phase line start permanent magnet synchronous motor as described above will be described as follows.

To begin with, the rotary shaft 32 is coupled to the shaft center of the rotor 31, and the bearings 33 are coupled to a predetermined positions on both sides of the rotor 31.

In addition, the above assembly is pushed into the first housing 35 in which the stator 11 is pressed and coupled on a predetermined position inside so that the rotary shaft 32 is passed through the through hole (not defined by a reference numeral) formed on the first housing 35, and after that, the bearing 33 coupled on one side of the rotor 31 is press-fitted into the bearing receiving part 39 which is formed on one side of the first housing 35.

After that, the opposite bearing 33 coupled to the rotor 31 is press fitted into the bearing receiving part 41 of the second housing 37, then the second housing 37 completely covers the opened part of the first housing 35. And then, the assembling processes are completed.

Hereinafter, operations of the single phase line start permanent magnet synchronous motor constructed as above will be described as follows.

During starting the motor, when a single phase alternating power, that is, a large starting current is applied to the coil 27 through the starting condenser Cs and the operating condenser Cr which are series connected to the sub coil 28b, a large starting rotate magnetic field is generated. At the same time, an induced voltage is generated on the secondary conductor 47 of the rotor 31 by the rotate magnetic field, and then a large starting torque is generated between a rotary magnetomotive force by the coil 27 and the current generated by the organic voltage, whereby a torque is generated as in an induction motor and the rotor 31 is reached near a synchronous rotational revolution(rpm).

At that time, the PTC thermistor flows electric current to the coil 27 until the synchronous rotational revolution(rpm), that is, a synchronous speed is nearly reached, and then a resistance of the PTC thermistor is increased by heat generation of its own, then the current value is decreased and the circuit is opened, whereby the current flowing on the starting condenser Cs is broken.

Accordingly, the motor is operated as a predetermined synchronous speed using only the operating condenser Cr, the main coil 28a, and the sub coil 28b in the rotor 31 with high efficiency.

Hereinafter, an example of another wiring state of the coil in the motor according to the present invention will be described as follows.

Figure 12:
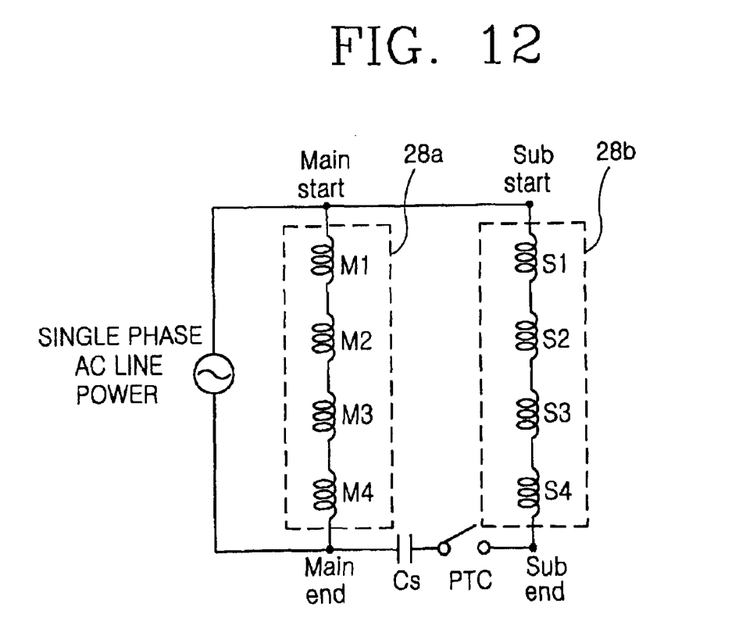
FIG. 12 is a schematic view showing an another wiring state of a coil in the motor according to the present invention.

As shown in FIG. 12, the coil 27 comprises a main coil 28a and a sub coil 28b connected parallelly with each other and having a plurality of coil parts M1~M4, and S1~S4 which are series connected with each other. In addition, the operating condenser Cr and PTC thermistor are respectively series connected to ends of the main coil 28a and the sub coil 28b.

According to the above structure, when a commercial alternating electric power is applied to the coil 27, the electric power is applied to the sub coil 28*b* through the starting condenser Cs and the PTC thermistor, and therefore a large starting rotate magnetic field is generated and the rotor 31 are rotated centering around the rotary shaft 32.

In addition, the rotating speed of the rotor 31 is approached near the synchronous speed, the PTC thermistor opens the circuit since the resistance is increased by heat generation of its own and the current value is decreased. And accordingly, the rotor 31 is operated as a predetermined synchronous speed using only an alternating magnetic field generated on the main coil 28*a* with high efficiency. In this case, a power consumption can be reduced because the input current value is not consumed in the sub coil 28*b*.

Hereinafter, still another example of wiring state of coil in the motor according to the present invention will be described as follows.

Figure 13:
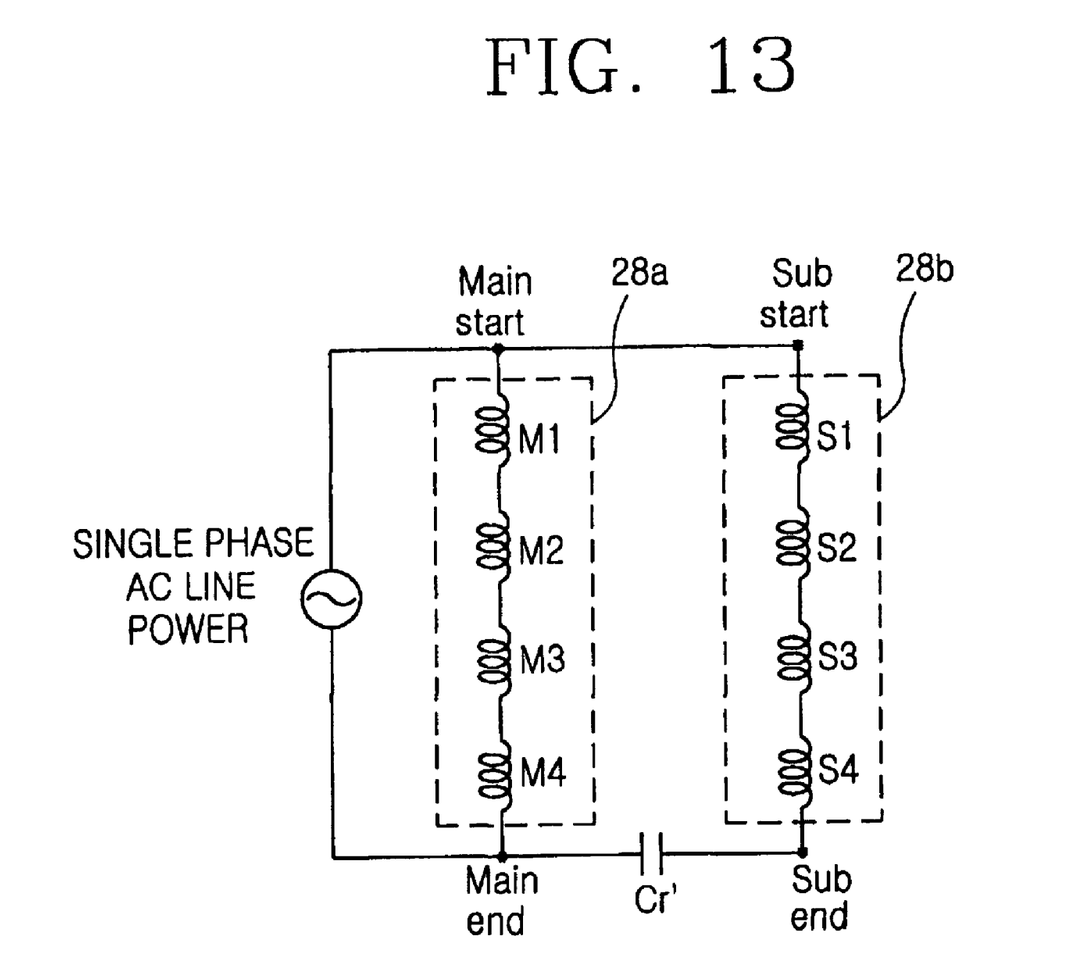
FIG. 13 is a schematic view showing a still another wiring state of a coil in the motor according to the present invention.

As shown in FIG. 13, the coil 27 comprises a main coil 28*a* and a sub coil 28*b* parallelly connected with each other and having a plurality of coil parts M1~M4, and S1~S4 which are series connected with each other, and an operating condenser Cr' is series connected to ends of the main coil 28*a* and the sub coil 28*b*.

Herein, the operating condenser Cr' has relatively larger capacity than that of the previous operating condenser Cr so that the starting and operating can be made without additional starting condenser Cs and the PTC thermistor, and has relatively smaller capacity than that of the starting condenser Cs.

In that case, a high efficiency operation can be made as a predetermined synchronous speed using only the operating condenser Cr' without additional PTC theremistor and the starting condenser Cs, and the structure of driving circuit is simple and costs low expenses.

Operations and effects of the single phase line start permanent magnet synchronous motor according to the present invention will be described as follows.

An initial starting of the motor is started by an interaction between magnetic fields of the coil and of the secondary conductor, and an normal operation can be performed using only the permanent magnet and the operating condenser of small capacity, only the main coil, or only the operating condenser when the synchronous rotating speed is reached and the rotation is started, and therefore an additional direct current supplying device for supplying the direct current and the position sensor for sensing the rotational position of the rotor can be excluded, the structure can be made compactly by constructing the driving circuit simply, and manufacturing cost can be reduced.

Also, the detent groove is formed for driving and the air gap is increased in the conventional brushless direct current motor, however, the detent groove is not formed and the efficiency can be improved according to the present invention.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A single phase line start permanent magnet synchronous motor comprising:

a rotary shaft;

a rotor including:
  a rotor core coupled to an outer circumferential surface of the rotary shaft so as to be rotatable;
  a plurality of permanent magnets inserted into the rotor core in rotary shaft line direction and apart from each other in circumferential direction; and
  at least one secondary conductor ring inserted and coupled in a plurality of rotor slots formed between a plurality of protruded parts of the rotor core;

a stator located on an outer circumferential surface of the rotor with a predetermined air gap therebetween;

bearings supporting both end parts of the rotary shaft in shaft line direction of the rotary shaft so as to support the rotary shaft;

a first housing, through which the rotary compressor penetrates, coupled to an outer circumferential surface of the stator for receiving a bearing on one side between the bearings; and a second housing, through which the rotary compressor penetrates, coupled to one side of the first housing for receiving a bearing on the other side between the bearings.

2. The motor of claim 1, wherein the rotor core further comprises a permanent magnet receiving part so as to receive a permanent magnet in shaft line direction of the rotary shaft.

3. The motor of claim 1, wherein said at least one secondary conductor ring has one side connected and the other side opened so that a plurality of slits corresponding to a plurality of protruded parts on the rotor core can be formed on an outer circumferential surface of the secondary conductor.

4. The motor of claim 3, wherein said at least one secondary conducting ring comprising two secondary conductor ring portions is coupled from both sides of the rotor core along with shaft line direction of the rotor core, and integrated by a coupling means such as a welding.

5. The motor of claim 1, wherein side surface of said at least one secondary conducting ring is connected by a process such as press processing and slits are formed inside the secondary conductor so that the protruded parts of the rotor core can be inserted therein.

6. The motor of claim 5, wherein said at least one secondary conducting ring is formed by soft material having high electrical conductivity and rolled on the outer circumferential surface of the rotor core, and a coupled surface is integrated by a coupling means such as a welding.

7. The motor of claim 1, wherein the permanent magnet is formed to have a square cross section.

8. The motor of claim 1, wherein the permanent magnet is formed so that one circumferential part is an arc shape when cutting across the rotary shaft line direction, and the permanent magnet receiving part is formed so that the circumferential part of arc shape faces the rotary shaft when the permanent magnet is received.

9. The motor of claim 1, wherein the stator core comprises:

a plurality of yoke parts having circular ring shapes; and a plurality of teeth parts coupled to inside of the yoke parts so as to be protruded in radial direction and apart from each other in circumferential direction.

10. The motor of claim 9, wherein at least one notch part which is depressed in radial direction and extended in rotary shaft line direction is formed on end part of the teeth part along with the protruded direction.

11. The motor of claim 9, wherein a projection part which is protruded toward other contact surface is formed on contact surfaces of the yoke parts and the teeth parts; and a projection receiving part is formed on the other between the yoke part and the teeth part depressed so as to receive the projection part.

12. The motor of claim 11, wherein the projection part is press fitted and coupled into the projection receiving part.

13. The motor of claim 1 further comprising a circuit substrate for wiring coupled to one side of the stator for wiring of the coil.

14. The motor of claim 1, wherein the coil comprises:

a main coil including a plurality of coil parts which are wound on a bobbin coupled to an outer circumferential surface of the teeth parts with 90° of electric phase difference along with a boundary of the stator and series connected with each other; and a sub coil including a plurality of coil parts which are disposed between the respective coil parts of the main coil along with the circumferential direction of the stator and series connected with each other, and parallelly connected to the main coil.

15. The motor of claim 14, further comprising an operating condenser electrically connected between the main coil and the sub coil for driving and operating the rotor.

16. The motor of claim 14, further comprising:

a starting condenser having one end electrically connected to the main coil and the other end electrically series connected to the sub coil; and an automatic power cutting means series connected between the starting condenser and the sub coil for automatically cutting the power of the starting condenser.

17. The motor of claim 14, further comprising:

an operating condenser electrically connected between the main coil and the sub coil;

a starting condenser having one end electrically connected between the main coil and the operating condenser, and the other end electrically connected between the operating condenser and the sub coil; and an automatic power cutting means series connected between the starting condenser and the sub coil for automatically cutting the power of the starting condenser if the speed of the rotor is reached to a predetermined speed after the rotor is operated.

18. The motor of claim 14, wherein the respective coil parts, and of the main coil and the sub coil are concentratively wound on the bobbin coupled to the outer circumferential surfaces of the respective teeth parts.

* * * * *